Figure 1:
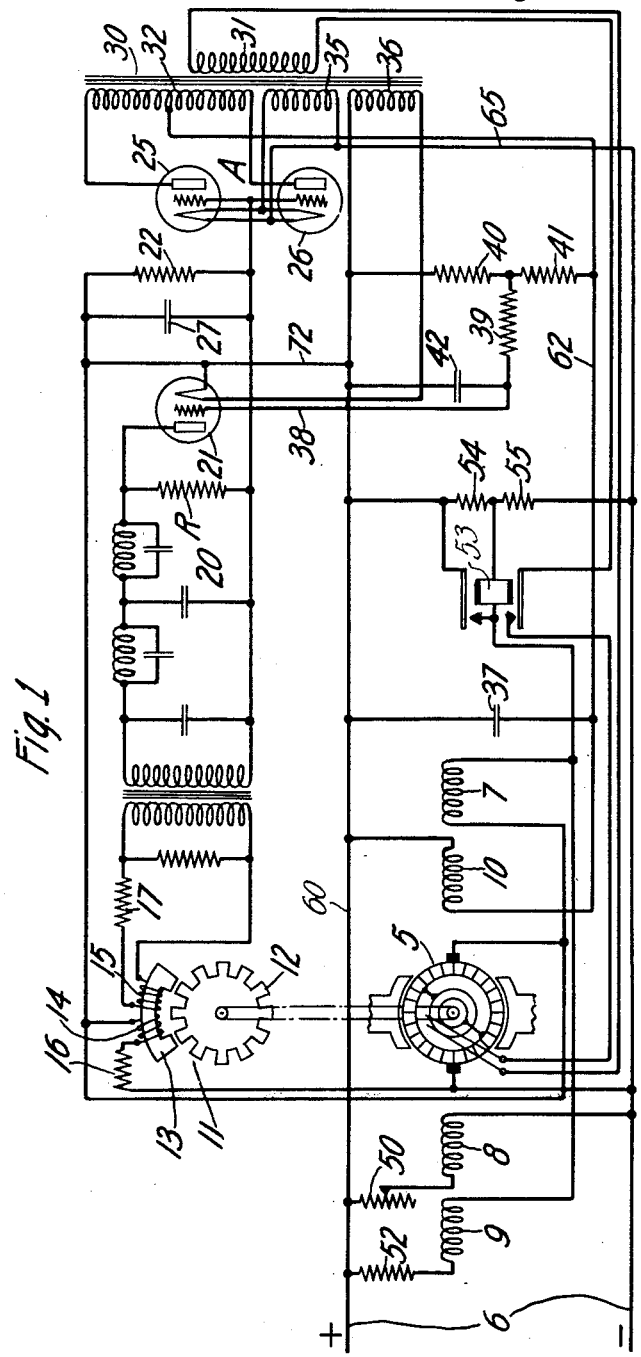

March 13, 1928.

H. M. STOLLER

REGULATING SYSTEM

Filed Aug. 4, 1926

1,662,085

Inventor:
Hugh M. Stoller
by W. Griggs
Attorney

Patented Mar. 13, 1928.

1,662,085

UNITED STATES PATENT OFFICE.

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK.

REGULATING SYSTEM.

Application filed August 4, 1926. Serial No. 127,051.

This invention relates to regulating systems and aims for stability and precision in regulating mechanical or electrical characteristics, as for example speed, frequency or voltage.

As a specific example of applications of the invention there is described hereinafter the operation of an electric system embodying one form of the invention in maintaining the speed of an electric motor sensibly constant.

A copending application of E. C. Manderfeld, Serial No. 127,091 filed of even date herewith, entitled "Regulating systems", discloses a system for regulating the speed of a direct current motor. In that system the motor drives a high frequency generator, for supplying E. M. F. to the plate of an electric space discharge rectifier tube through a low pass filter which has a fairly sharp cut-off at a frequency slightly below the frequency which the generator delivers at normal speed of the motor. In the rectifier plate circuit is a coupling resistance shunted by a by-pass condenser. The voltage across the resistance is applied to the grid circuit of a space discharge amplifier. The motor speed is regulated by passage of the amplifier plate current through a regulating field winding on the motor. The constants of the system are such that at normal motor speed the generator frequency is slightly above the cut-off frequency of the filter and corresponds to a point on the steep, negatively sloping portion of the voltage-frequency characteristic of the generator and the filter combined. Change in the motor speed and consequently in the generator frequency, causes the potential applied from the filter to the rectifier plate to vary in such manner that the resulting change in current in the regulating field winding of the motor checks the change in the motor speed. The space discharge rectifier has a grid for controlling the discharge, and the amplifier output is caused to render the rectifier grid potential negative by an amount varying with the amplifier output. This feed-back from the amplifier output to the rectifier grid gives a motor speed control effect cumulative with that which would exist in the absence of the feed-back.

The specific form of the instant invention shown in the drawing is a system having the features just described, but in which a time lag is introduced in the feed-back from the amplifier output to the rectifier grid, to enable the desired precision of regulation to be obtained without hunting or oscillation of the speed about a mean value. The feedback with time lag is obtained by a network consisting of a shunt resistance across the regulating field winding, a condenser and a high resistance connected in series across a portion of the shunt resistance, and conductors connecting the rectifier grid and filament across the condenser.

A feature of the invention is an electric regulating system which has means, responsive to variation of a characteristic such as those mentioned above, for exerting upon the characteristic a regulating effect insufficient to completely compensate for the variation in a given time, and means responding to action of the first means for causing another regulating effect upon the characteristic, cumulative with the first effect but later in its time of application, and of proper magnitude to substantially just complete the compensation in the given time.

Other objects and features of the invention will be apparent from the following description and claims.

Figure 2:
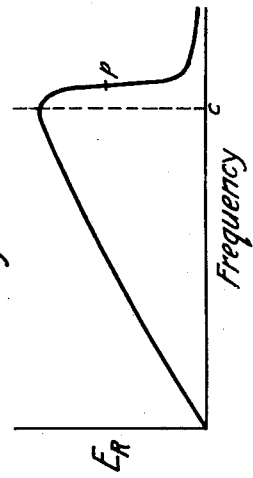

Fig. 1 is a circuit diagram of a system embodying one form of the invention and Fig. 2 is a curve for facilitating explanation of the invention.

In the following description of the specific form of the invention shown in the drawing, a specific set of values of speeds, frequencies, capacities, resistances, etc., is mentioned, by way of example only.

In the drawing is shown an electric motor 5 which is to have its speed held constant at, for example 1200 R. P. M., regardless of changes in operating conditions, such as changes in the voltage delivered by line 6 which supplies power for the operation of the motor, changes in the load (not shown) on the motor, changes in temperature, etc. The motor is shown as a direct current compound wound dynamo electric machine which has, in addition to its permanent series field winding 7 and its shunt field winding 8, an auxiliary series field winding 9 used in starting the motor and an auxiliary regulating field winding 10 under control of a vacuum tube regulator described hereinafter. All of these field windings are accumulative. An alternator 11 producing a high frequency, as for example 720 cycles at 1200 R. P. M., is driven from the motor. The alternator is shown as a small inductor type generator such as is disclosed in a copending application in the name of H. M. Stoller and E. R. Morton, Serial No. 124,599, filed July 24, 1926. The generator comprises a toothed rotor 12, and a stator 13 on which is an exciting winding 14 and an armature winding 15. A resistor 16 is included in series with the winding 14 for adjusting the value of the current in that winding. A resistor 17 is included in series with winding 15 to adjust the value of the normal current output from the winding.

The 720 cycle current from the generator passes through a low-pass filter 20 which transmits readily at any frequency up to 700 cycles per second and has a sharp cut-off on higher frequencies. The output voltage from this filter is impressed upon the plate of a three-electrode electric space discharge rectifier or detector tube 21 which through a coupling resistance 22 having, by way of example, a value of 100,000 ohms varies the grid potential of an amplifier A comprising two three-electrode space discharge tubes 25 and 26. A condenser 27 connected across resistance 22 suppresses the voltage fluctuations across the resistance. This condenser may have a capacity of, for example, .01 m. f. The current for the motor regulating field 10 passes through the space discharge paths of the amplifier A, so that the amplifier varies the current through the regulating field as described hereinafter. The power supply for the filament of tubes 21, 25 and 26 and for the plates of the amplifier tubes 25 and 26, is obtained from a transformer 30, and as explained hereinafter, the voltage of line 6 is also applied to the plate of the amplifier tubes 25 and 26. The primary winding 31 of this transformer is fed from a pair of slip rings connected to two electrically opposite commutator bars on the motor, which deliver 80 volts at 20 cycles per second to the slip rings. A secondary winding 32 of the transformer has its ends connected to the plates of tubes 25 and 26 respectively, and supplies current to those plates through a circuit extending from the positive conductor of line 6 through regulating field winding 10, conductor 62, the two halves of winding 32 and the space discharge paths of tubes 25 and 26 and conductor 65, to the negative conductor of line 6. A secondary winding 35 of the transformer is connected across the filaments of tubes 25 and 26 in parallel. A secondary winding 36 of the transformer 31 was connected across the filament of tube 21. The line 6 supplies direct current to the motor, at, for example 110 volts, and also serves as a source of positive "C" voltage for polarizing the grids of the amplifier tubes 25 and 26 from the positive line conductor through leads 60, and 72 and resistance 22, the filaments of these tubes being connected to the negative conductor of line 6 by conductor 65. A condenser 37 connected across the motor regulating field winding 10 suppresses voltage fluctuations across that winding, of frequencies of the order of the frequencies due to the rectifier action of amplifier A. This condenser may have a capacity of, for example, 0.1 m. f. A conductor 38 connects the grid of the rectifier tube through a one megohm resistance 39 to the junction point of two resistors 40 and 41 connected in series across the winding 10. A condenser 42 is connected across the grid and filament of tube 21, one side of the condenser connecting to the grid through conductor 38 and the other side of the condenser connecting to the filament through conductor 72. The capacity of condenser 42 may be 1 m. f. The resistances 40 and 41 may have values of about 10,000 and 50,000 ohms, respectively.

The curve in Fig. 2 is the voltage—frequency characteristic or voltage—speed characteristic of the generator 11 and filter 20 combined. The frequency varies with the motor speed. As the motor accelerates from stand still, the voltage at the output terminals of the filter rises, due to the rise in the increasing terminal voltage of the generator, until the frequency reaches the neighborhood of the frequency $c$, which is at 700 cycles, the cut-off frequency of the filter. As the frequency increases above the cut-off frequency, the voltage at the output terminals of the filter decreases. For reasons made apparent hereinafter, the constants of the system are so adjusted that the normal operating point for the motor, or in other words the point of the curve which corresponds to normal motor speed, is on the steep portion of the curve which lies just above the cut-off frequency and has negative slope, for example the point $p$.

The motor is started by closing a switch (not shown) for connecting the line 6 to the generator (not shown) from which the line derives power. This puts full shunt field current on the motor from the upper or positive conductor of the line, through the fixed field resistance unit 50. Armature current for the motor flows from the positive line conductor through a starting resistance 52, for example, three ohms, through starting series field winding 9, permanent series field winding 7, through the armature and back to the negative conductor on line 6. The motor therefore starts as a compound wound motor having a strong field with a fixed resistance in the armature circuit. When the speed of the motor has reached about 750

R. P. M. the voltage drop across the armature, due to the counter E. M. F. has risen to a value sufficient to cause operation of a starting relay 53. The winding of this relay is in a diagonal of a Wheatstone bridge circuit, two arms of the bridge consisting of resistance units 54 and 55 respectively, having their junction at one end of the diagonal, a third arm of the bridge consisting of the starting resistance 52 and field winding 9, and the fourth arm consisting of the field winding 7 and the armature. The upper contact of this relay connects the right-hand end of permanent series field winding 7 directly to the positive conductor of line 6, thereby short-circuiting the 3 ohm series resistance and the starting field winding 9 of the motor. This converts the motor into a straight compound wound motor directly connected to the line. The lower contact of the starting relay applies E. M. F., approaching a voltage of 80 volts and a frequency of 20 cycles per second as the motor approaches normal speed, from the slip rings on the motor to the primary winding 31 of the transformer 30, thereby causing a secondary winding 32 to impress plate voltage on the amplifier tubes 25 and 26, space current from which flows through the regulating field winding. This voltage is impressed on the plates in superposition on the line voltage, through a circuit traced above. At the same time the alternator is impressing high frequency on the filter 20, the output of which is connected to the plate of the rectifier tube 21. Since this is a low-pass filter and the motor has attained considerable speed but is not yet fully up to normal speed, the motor is still operating on the part of the curve of Fig. 2 which has a slope of positive sign and the detector tube current is large and produces an IR drop in the 100,000 ohm coupling resistance 22 which drives the grids of the amplifier tubes 25 and 26 negative, thereby suppressing current through the regulating field of the motor and giving the motor a weak field which tends to increase its speed.

The motor therefore will continue to accelerate until the speed reaches the value corresponding to the cut-off frequency of the low-pass filter, whereupon the plate voltage applied to the detector tube decreases, consequently decreasing the current through the coupling resistance and decreasing the negative "C" voltage on the grids of the amplifier tubes 25 and 26. This causes a sudden increase in the space current of the amplifier, thereby strengthening the regulating field and preventing a further increase in speed. The motor has thus accelerated to its normal speed.

In earlier stages of the acceleration, that voltage at the output of the filter which is due to the generator is low, and positive potential applied from line 6 to the grids of tubes 25 and 26 through the resistance 22 tends to cause the regulating field to be strong; and where it is permissible to dispense with the auxiliary starting field this effect of the regulator may be used in causing the motor torque and counter E. M. F. and field strength to have the requisite values for the low speeds of the motor.

A manner in which the system may be operated to maintain constant motor speed under varying operating conditions, as for example varying line voltage or varying load on the motor will now be described. The normal speed of the motor corresponds to, say, the point $p$ on the curve of Fig. 2. When there occurs an increase in line voltage, there results a decrease in filter output voltage and in plate voltage of tube 21, and therefore a decrease in plate current of tube 21 and a consequent increase in plate current of tubes 25 and 26, thereby tending to prevent a rise in speed. The increase in the amplifier plate current will increase the drop across the regulating field 10 and therefore ultimately the voltage applied from across the resistance 40 through the resistance 39 to the condenser 42. The voltage across the condenser, however, does not increase immediately but lags behind by a time element which is directly proportional to the value of the resistance 39 and the size of the condenser. This time element should preferably be of the same order or greater than the natural period of oscillation of the system (i. e., the time for one cycle at the hunting frequency of the system). This natural period can readily be obtained in any system by momentarily short-circuiting the resistance 39 and noting the time for one oscillation. This time element is greater the greater the mechanical inertia of the system. Consequently after this time lag the negative voltage applied to the grid of the detector tube will be increased, thereby decreasing the detector tube plate current, which will cause the regulating point to move back to its initial position, at $p$, on the slope of the characteristic curve. By the network comprising the resistances 39, 40 and 41 and the condenser 42 and the grid of tube 21, the system is given stability together with precision. If on the other hand, the line voltage suddenly decreases there results an increase in filter output voltage or plate voltage of tube 21, and therefore in plate current of tube 21, and consequently a decrease in plate current of tubes 25 and 26, thereby tending to prevent a decrease in speed; and the compensating network functions to give a further, but delayed, tendency to prevent a decrease in speed. Should there occur an increase in load on the motor, tending to slow down the motor to a speed lower than normal, the system will operate in the manner just described in connection with compensation for line voltage decrease, to maintain normal speed. Should the load on the motor suddenly decrease, tending to cause the motor speed to exceed its normal value, the system will operate in the manner described above in connection with the compensation for increase of line voltage, to maintain normal motor speed.

The low-pass filter is designed to have a sharp cut-off. It is not desirable, however, to have the cut-off too sharp. By way of example, in one case a slope of about 25 to 1 was found to be the optimum slope. This slope is as steep as is consistent with requisite stability; and to improve the sensitivity and precision of regulation network for giving the delayed feed-back action is incorporated in the system.

The amplifier tubes 25 and 26 serve as a full wave rectifier to rectify the waves induced in the secondary winding 32, under control of the grid bias, for energizing the regulating field winding; and the superposition, upon the voltage waves induced in winding 32, of the direct voltage from line 6, increases the useful portion of those waves, by raising the mean positive value of the resultant voltage applied to the plates of tubes 25 and 26, or in other words by, in effect, shifting the zero axis of the waves downwardly.

The filaments of tubes 25 and 26 are connected to the negative conductor of line 6 by lead 65. The grids of these tubes are connected to the positive conductor of the line 6 through resistance 22. When the speed of the motor reaches a value corresponding to a frequency somewhat higher than the frequency at point $p$ the plate of the rectifier tube 21 is no longer supplied with power at sufficient voltage to overcome the voltage drop in resistance 22 due to the current drawn by the grids of tubes 25 and 26 from the positive line conductor through leads 60, 61, 71 and 72. Since space current no longer flows through the detector 21, the current through the regulating field winding is large, the grids of tubes 25 and 26 being positive with respect to their filaments. Therefore there is a very strong tendency to slow the motor down.

What is claimed is:

1. In a regulator system, a dynamo electric machine having a regulating field winding for controlling an operating characteristic of the machine, means for automatically varying the excitation of said field winding to maintain said machine operating characteristic constant and comprising an electron discharge tube and an amplifier having an input circuit connected to said tube and an output circuit connected to said regulating field, means comprising a feed-back circuit for impressing a potential from the amplifier output circuit on said tube, and means for effecting a time lag in the feedback from the amplifier output circuit to prevent hunting action.

2. In a speed regulator system, a motor having a regulating field, means for automatically controlling the excitation of said field to maintain the motor speed constant and comprising a discharge tube and an amplifier connected to said tube, and means operating after a time lag for impressing a potential from the amplifier output circuit upon the tube to change the operation of said tube and prevent hunting action.

3. In a regulator system, a dynamo electric machine, means comprising an electron discharge tube and an amplifier connected to the tube for maintaining an operating characteristic of the motor constant, and means for connecting the output circuit of the amplifier to said discharge tube for effecting a feed-back with a time lag to change the operation of the tube and prevent hunting action.

4. In a regulator system, a dynamo electric machine, means comprising an electron discharge tube having anode, cathode grid elements and an amplifier connected to the tube for maintaining an operating characteristic of the machine constant, and means for connecting the output circuit of the amplifier to the grid of said tube for effecting a feed-back with a time lag to change the operation of the tube and prevent hunting action.

5. In a regulator system, a dynamo electric machine having a regulating field for controlling an operating characteristic thereof, means for automatically controlling the excitation of said regulating field to maintain said operating characteristic of the motor constant, said means comprising a vacuum tube having anode, cathode and grid elements and an amplifier having an input circuit connected to the tube and an output circuit connected to said regulating field, and means for impressing a negative potential from the amplifier output circuit on the grid of said tube with a time lag to prevent hunting action.

6. In a regulator system, a dynamo-electric machine, means for maintaining an operating characteristic of said machine substantially constant and comprising a three element discharge tube serving as a rectifier, and means controlled by the current rectified by said tube for impressing a potential after a time lag on the grid of said tube for preventing hunting action.

7. In a speed regulator system, a motor having a regulating field winding, means for automatically regulating said field winding to maintain the motor speed constant and comprising an electron discharge device having anode, cathode and grid elements and an amplifier connected to the tube, said amplifier having an output circuit connected to said field winding, a potentiometer connected across the amplifier output circuit, means for impressing the voltage drop across a portion of said potentiometer on said grid, and means comprising a reactance element and a resistor for effecting a time lag in the feed back from the potentiometer to said grid to prevent hunting action.

8. In a speed regulator system, a motor having a regulating field, a source of alternating current having the frequency thereof varied according to the speed of the motor, means comprising a three element discharge tube and an amplifier for controlling the excitation of said field winding according to the frequency of said alternating current to maintain the motor speed constant, the output circuit of said amplifier being connected to said field winding, a feed back circuit from the output circuit of said amplifier to an element of said tube, and means for effecting a time lag in the feed back to the tube to changing the operation of the tube to prevent hunting action.

9. In a speed regulator system, a motor having a regulating field to control the motor speed, means for automatically regulating said field winding to maintain the motor speed constant and comprising an electron discharge tube and an amplifier having an input circuit connected to said tube and an output circuit connected to said regulating field, a feed back circuit from the output circuit of the amplifier to said tube, and means comprising a condenser and a resistor connected to said feed back circuit for effecting a time lag in the feed back from the amplifier circuit to said tube.

10. In a speed regulator system, a motor having a regulating field, a source of alternating current having the frequency thereof varied according to the speed of the motor, an electron discharge tube having anode, cathode and grid elements, a low pass filter for connecting said tube to the source of alternating current, an amplifier having an input circuit connected to said tube and an output circuit connected to the regulating field for varying the energization of the field winding to maintain the motor speed constant, a feed back circuit connection from the amplifier output circuit to the grid of said tube, and a condenser and a resistor connected to said feed back circuit for effecting a time lag in the feed back from the amplifier output circuit to said grid to prevent hunting action.

11. In a regulator system, a dynamo electric machine, means comprising a space discharge tube for maintaining an operating characteristic of the machine substantially constant, and means controlled by the output of said tube after a time lag for reacting on said tube to change its operation and avoid hunting action.

12. In a regulator system, a dynamo eletric machine, means comprising a three element space discharge tube for maintaining an operating characteristic of said machine substantially constant, and means for impressing with a time lag a potential on one element of said tube which varies inversely with the current flowing through the tube.

13. In a regulator system, a dynamo electric machine having a regulating field winding, means comprising a space discharge tube having an anode, a cathode and a grid element for controlling said regulating field to maintain an operating characteristic of said machine substantially constant, and means for impressing a potential on the grid of said tube which varies with the current flowing through the tube after an adjustable time lag to prevent hunting action.

14. In a regulator system, a dynamo electric machine having a regulating field winding, means comprising a space discharge tube for controlling said field winding to maintain an operating characteristic of the machine substantially constant, and means for effecting a feedback with a time lag from the field winding circuit to said tube to change the operation of the tube and to avoid hunting action.

15. In a speed regulator system, a motor having a regulating field winding, a source of alternating current having the frequency thereof vary according to the speed of the motor, means comprising a space discharge tube having an anode, a cathode and grid element for controlling the excitation of said field winding according to the frequency of said alternating current to maintain the motor speed constant, and means for impressing a potential on said grid which varies with the current of said field after a time lag to avoid hunting action.

16. In a regulator system, a dynamo electric machine having a regulating field winding, means comprising a space discharge tube having an anode, a cathode and a grid element for controlling the regulating field winding to maintain a characteristic of the machine substantially constant, and means comprising a feedback circuit for impressing on said grid a potential which varies according to the field winding excitation, said last mentioned means having a reactance element and a resistance element for effecting a time lag in the feedback to the grid element.

In witness whereof, I hereunto subscribe my name this 3 day of August A. D., 1926.

HUGH M. STOLLER.